May 19, 1936.　　　F. G. HENRY　　　2,041,411
COPY CONVEYER
Filed March 17, 1932　　　2 Sheets-Sheet 1
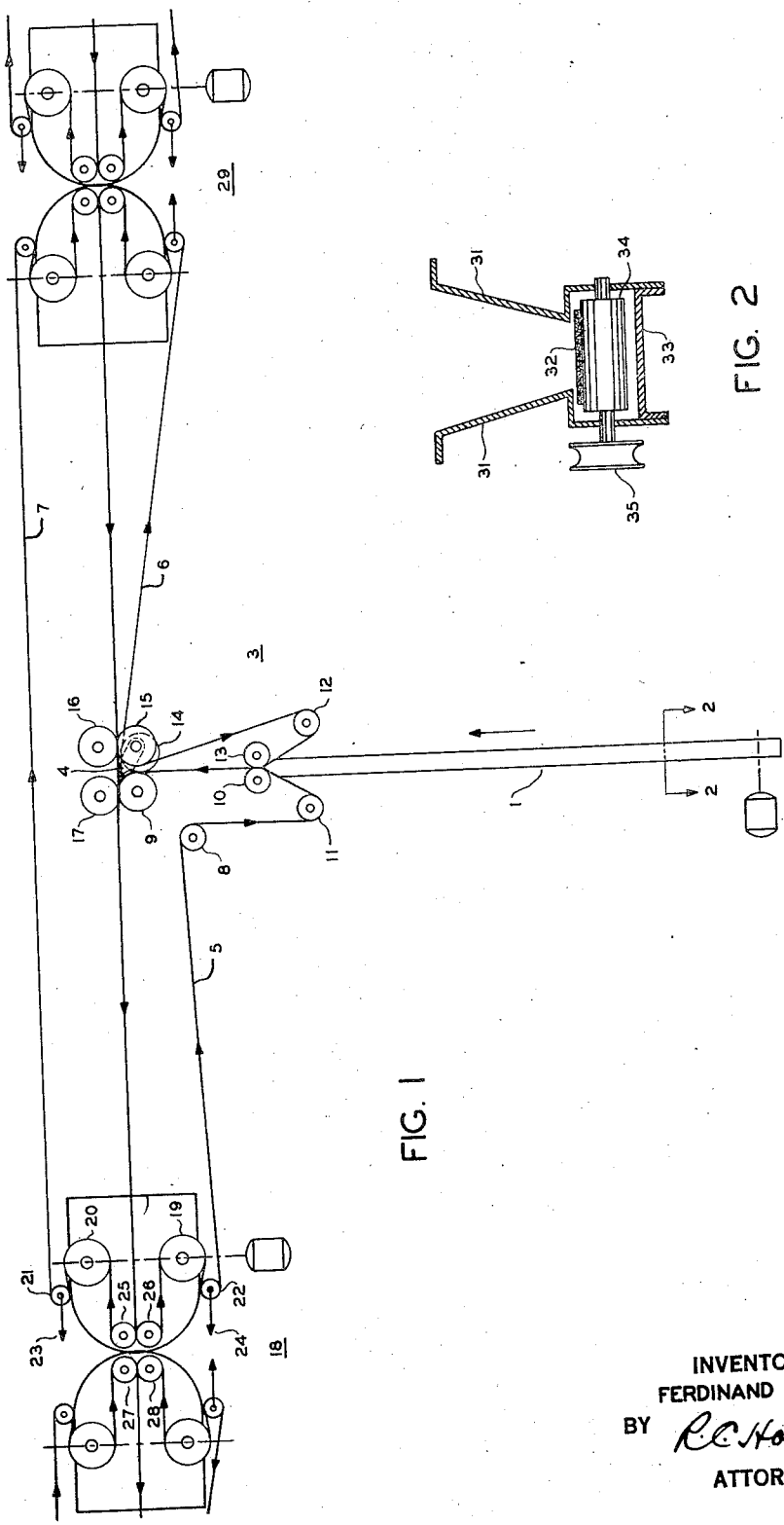
INVENTOR
FERDINAND G. HENRY
BY R.C. Hopgood
ATTORNEY May 19, 1936.  F. G. HENRY  2,041,411
COPY CONVEYER
Filed March 17, 1932   2 Sheets-Sheet 2

INVENTOR
FERDINAND G. HENRY
BY R C Hopgood
ATTORNEY

Patented May 19, 1936

2,041,411

UNITED STATES PATENT OFFICE 2,041,411

COPY CONVEYER

Ferdinand G. Henry, Moline, Ill., assignor to International Communications Laboratories, Inc., Newark, N. J., a corporation of New York Application March 17, 1932, Serial No. 599,508

7 Claims. (Cl. 198—165)

This invention relates to conveyers and conveyer systems, and more particularly to conveyer systems of the endless belt type adapted to transport flat parcels or packages, such as telegrams, letters, folders, and the like.

In many of the conveying systems in use, at the present time, cord conveying means and belt conveying means are used. These systems have been found to fold and crease the travelling papers and very often to cut and tear them.

The present invention is especially concerned with a conveyer of this general nature, one of the objects being to provide such a simple construction of the members supporting the endless belt or cord members whereby excessive interweaving of the latter is rendered unnecessary for effective operation of the conveyer system.

Other objects and advantages of the invention, as well as features of the same, will appear more clearly upon referring to the following description of the apparatus shown in the accompanying drawings:

Fig. 1 is a general sectional view of the entire conveyer unit from above. Only one endless cord is shown as passing over each roller member.

Fig. 2 is a sectional view of the V-shaped conveyer taken along the line 2—2 of Fig. 1, showing also a sectional view of the conveyer. It is a more detailed view, than that given in Fig. 1, of the V-shaped trough conveyer used in connection with the cord conveyer. The trough conveyer is arranged for transferring articles from a conveyer of the trough and belt type to a strand or cord type of conveyer.

Figure 3:
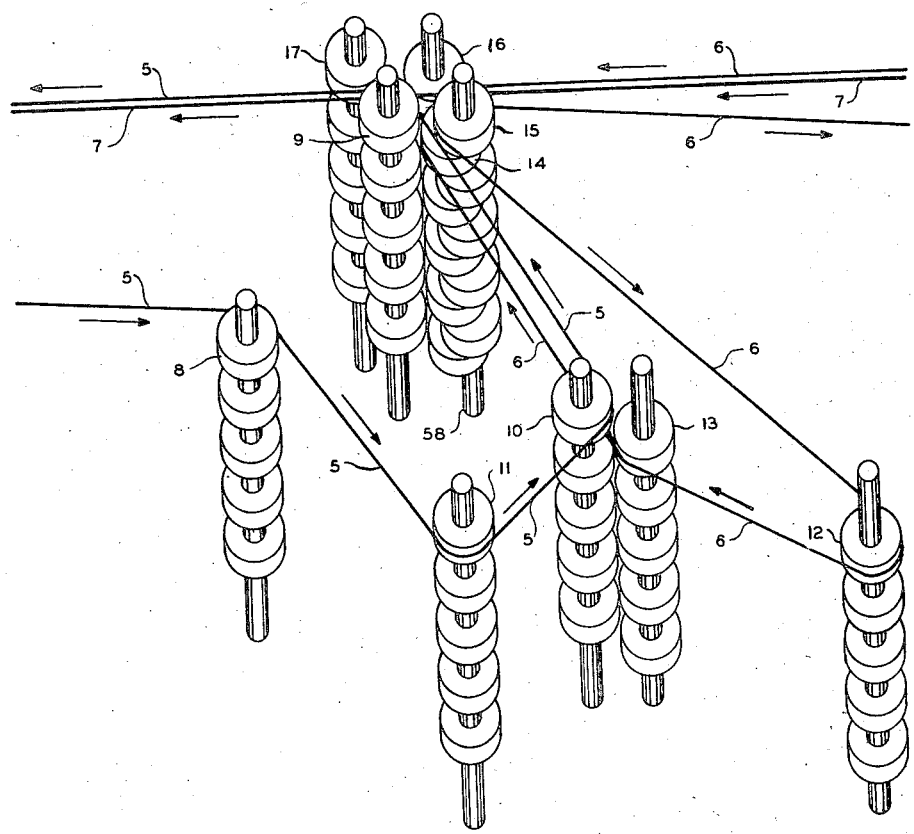

Fig. 3 is a detailed perspective view of a receiving station at the end of a belt conveyer, the latter being omitted for ease of description.

Figure 4:
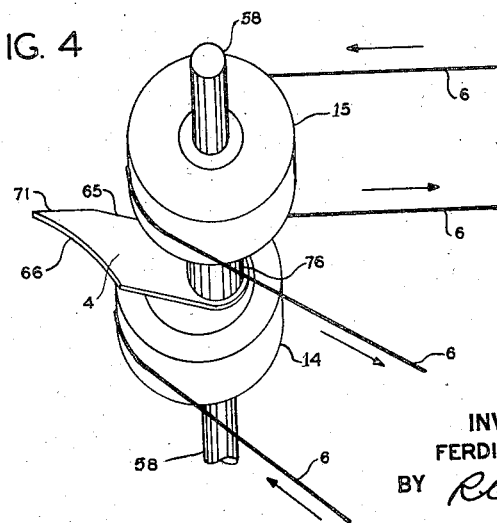

Fig. 4 is a detailed perspective view of the guiding members or guiding discs for directing telegrams and the like, already in the main channel of the cord conveyer, from the right half to the left half of the conveyer shown in Fig. 1 and simultaneously directing new telegrams from an intermediate receiving station or auxiliary channel, such as shown in Fig. 3, into the main channel of the conveyer unit.

Referring now to the form of the invention illustrated in Fig. 1, it will be seen that a strand or cord type conveyer is therein contemplated. Only such detail is herein shown as is deemed necessary for a clear explanation of the invention.

The various elements of the invention are, of course, supported in a frame member which is not shown in any of the figures in order to simplify the diagrams. As here shown only one strand in each of the complete series of vertically spaced co-planar travelling sets of strands or cords 5, 6, 7 are indicated, in order to more clearly illustrate the operation of the system. The members of each of the sets of strands all travel in the same plane, different sets travelling in different planes, which planes may, however, be super-imposed upon one another in order to hold and transport messages from one end of the unit to the other end of the unit. Each strand passes over grooved rollers such as are indicated by numerals 8 to 17 inclusive, all of which are adapted to maintain a predetermined spacial relation between neighboring strands of a given set of strands. At transfer stations, also called terminal delivering stations, such as shown at 18, the individual sets of strands are diverted as a complete set, all the cords which are members of the same set of strands being always kept together. None of the cords ride over the message or telegram while the latter is passing over the respective grooved rollers. This is but one of the many advantages of the invention.

At point 18 the message may be transferred to a V-shaped conveyer and the message withdrawn, or it may be passed directly into a duplicate cord conveyer unit similar to the one from which it has been transferred, which latter unit may be disposed in the same general direction or placed angularly to the last conveyer unit, after which the message may be conveyed to a terminal delivering station. At the other end of the conveyer unit, indicated by numeral 29, is a terminal receiving station which is an exact duplicate of 18, but the cords here converge inwardly whereas at 18 they diverge.

Receiving station 3 is made up of a number of rollers 8 to 17 inclusive, one of which is made up of individual rollers mounted on the same shaft, alternate individual rollers being eccentrically mounted as shown at 14, with respect to a common shaft. All the other eccentrically mounted members of the same set as 14, namely, alternate rollers on this common shaft, are similarly eccentrically mounted and are free to turn on the eccentric mounting. This eccentric mounting of the pulleys 14 makes excessive interweaving of the belt members unnecessary for effective operation of the conveyer system from a plurality of receiving points. The remaining rollers indicated at 15 form a normally mounted set of rollers which are likewise free to turn on their normal mounting. This feature is more clearly shown in Figs. 3 and 4. Rollers 19 and 20 are the driving rollers, while rollers 21 and 22 are idler pulleys from which are suspended weights 23 and 24, respectively, for the purpose of keeping the strands or cords 7 and 5 under tension.

Sets of strands 5, 6 and 7 may each be made of one continuous piece, in which case connecting means must be provided for crossing over from one end, namely the starting end, to the other end, namely the terminal end, of the particular set of strands. This can readily be accomplished by means well known to those versed in the art. It is perhaps preferable to make each neighboring strand of the sets of strands 5, 6 and 7 a complete and closed strand, thereby rendering unnecessary the complete overhauling of the system, upon the discovery of a defect in one of the cords of the various sets of strands. When such strand is a completely closed cord any defect therein may be remedied by merely removing the defective cord, which may be accomplished in a very short time. The system may then be put into operation again, even though that particular one of the cords which was damaged be entirely removed from the set of strands.

Numeral 4 indicates the position in the system at which deflectors or guide plates are inserted. This feature of the invention is more clearly shown in Fig. 4.

Now, for the purpose of understanding how the system operates, the path of a telegram through the system will be traced. The completed message is inserted in an upright position into the V-shaped conveyer. The message is drawn out of the V-shaped conveyer where the latter ends, within the receiving station 3, where the message passes between strand sets passing over rollers 10 and 13. The sets of strands 5 and 6 hold the message until the front portion reaches the deflecting plates 4, whereupon the message is deflected to the left. Just before the rear portion of the message is released by strands 5 and 6, the front portion of the message is passed between sets of strands 5 and 7. The message passes on until it reaches the end of the system, as shown at rollers 25 and 26. At this point it is relayed into a duplicate conveyer unit upon being passed out of the first conveyer unit at terminal delivering station 18.

If a message comes into the cord conveyer unit, as completely shown in Fig. 1 at the extreme right hand end thereof, it passes through the main channel between strand sets 6 and 7 until it reaches deflector plates 4. Then deflector plates 4 function in such manner as to direct the message on its way from the channel between strands 6 and 7 to the channel between strands 5 and 7, whereupon it proceeds as in the above paragraph.

It is to be noted in the above that the message is always held flat and also that on all turns the message is not squeezed and creased against the grooves in the rollers and thereby crushed and cut. Furthermore, the individual strand sets do not necessarily run the entire length of the main channel, one or both members of the strand sets making up the main channel being discontinued at points along the main channel where intermediate receiving channels intersect the main channel.

The auxiliary belt conveyers leading up to receiving station 3 are composed primarily of so-called V belts running on operating tables and discharging into the cord belt conveyer. In the specific installation illustrated only a single V belt and single cord belt conveyer unit are shown, as in Fig. 1. In actual practice it may be desirable to have two or more V belts on each table, each one of the V belts being slightly inclined and discharging into separate high speed cord belt units disposed one below the other and all driven by the same driving means.

The complete assembly drawing of one of the V section copy conveyers is shown in Fig. 2. A cross-sectional end view is there shown. This view was taken on the line 2—2 of Fig. 1.

Fig. 2 shows the V type conveyer to be made up of two inclined metallic side members 31, bent so as to form a substantially triangular trough having a conveyer belt 32 at its bottom. Belt 32 runs over and is driven by roller 34 which, in turn, may be driven by any suitable means through pulley 35. The metallic side members 31 are bolted together by means of channel member 33.

For the purpose of understanding how the V conveyer inserts the message into the strand conveyer, the course of a message through the system will be traced. The message is dropped into the V chutes 31 on edge and preferably in an upright position, the printed matter facing the left hand V chute, thus enabling one to check the routing V chute, thus enabling one to check the routing of the article without removing it from the conveyer. The message is then driven by the belt 32 to the end of the trough within the receiving station, as at 3, Fig. 1, where it is introduced between the sets of cords 5, 6 which form an auxiliary channel of the cord conveyer unit, and then into the main channel of the cord conveyer unit formed by strand sets 5, 7, as previously described.

The belt conveyer inserts the message into the receiving station when it is received by cords 5, 6 and 7. Only one cord of each set is shown for the sake of simplicity. Guide member 4 is not shown in Fig. 3, being more clearly shown in Fig. 4.

Referring now more particularly to Fig. 3, the cord 5 passes first over roller 8 and then sequentially over rollers 11, 10, 9 as shown. Cord 6 passes first over roller 15 and then sequentially over rollers 16 and 17. Further detail is deemed unnecessary as Fig. 1 clearly reveals the completed path of these cords.

The message is driven by belt 32 between cords 5 and 6 which pass over rollers 10 and 13, at which point the message is inserted between cords 5 and 6. Upon reaching rollers 9 and 14 the message is deflected by guides 4 of Fig. 1. These guide plates are more clearly shown in Fig. 4 at numeral 4. The message is then guided between cords 5 and 7 which, in turn, pass over rollers 9 and 17 respectively.

As shown in the drawings, Fig. 3, rollers 14 and 15 are mounted on units made fast to shaft 58, although they are free to rotate on these mounting units. It is to be noted that the mounting units for individual rollers 14 are positioned eccentrically on the shaft 58.

The construction and placing of the guide plate is clearly shown in Fig. 4. Numeral 4 is one of the substantially triangular guiding members having laterally disposed flaring guiding edges 65 and 66. These edges extend through the spaces between the respective sets of strands 6 passing over rollers 15 and sets of strands 6 passing over rollers 14. These guiding plates are fixedly mounted on spacing members 76 which, in turn, are fixed to the shaft 58. Thus, when the telegrams coming from a belt conveyer into the auxiliary channel of the cord conveyer are freed from between the cords of the auxiliary channel, only one of which cords is shown passing over roller 14, the guiding edges 66 then direct the telegrams into proper position to be picked up by other cords passing between the edges 71 of deflecting guide member 4.

In a similar manner telegrams already in the cord conveyer but coming from a direction to the right of the guide plate are freed from between the sets of cords forming the main channel of the conveyer unit, one only of the cords of one set being shown, namely that cord passing over roller 5. The telegrams are directed by guiding edges 65 into proper position, to be picked up by sets of cords passing between the rear edge 71 of deflecting guide member 4.

Thus, when telegrams in the neighborhood of guiding plates 4 are freed at their initial or front edges, the guiding edges passing through the spaces between the sets of strands direct the telegrams into proper position, so that they may be reinserted into the main channel of the cord conveyer without additional handling, if the telegrams are coming from the main channel to the right of the guiding plates 4, or so that they may be inserted into the main channel of the chord conveyer, if the telegrams are coming from an auxiliary receiving station channel.

As shown in Fig. 4, alternate individual roller members 14 of one of the rollers are eccentrically mounted on auxiliary shafts fixedly mounted to main shaft 58. The successive individual roller members of this composite roller are separated by spacing members which are also fixedly attached to shaft 58. Deflecting guide members 4 are, in turn, fixedly attached to the spacing members 76. This is done in order that a message may be introduced on the main line and thereafter go through each junction of the main line with the receiving station without interfering with other messages being fed from the receiving station into the main line.

What is claimed is:

1. In a conveyer system, the combination of two independently operable conveyer sections, an intermediate conveyer section, an article supply source for said intermediate conveyer section, and means for rendering said intermediate conveyer section operable to receive simultaneously articles from one of said former conveyer sections and from said supply source and to deliver the received articles to the other of said former sections, said intermediate section comprising an endless main belt extending throughout the length thereof, a second endless belt co-operating with the main belt for a portion of the length of the intermediate section, and a third endless belt co-operating with the main belt for another portion of said section length for receiving articles from said one conveyer section and delivering them to a conveyer formed by co-operation of said second and said main endless belts, and co-operating with said second endless belt for receiving articles from said supply source and delivering them to the conveyer formed by co-operation of said second and said main endless belts.

2. In combination, a conveyer system having a terminal station and a plurality of receiving stations, sets of travelling strands connecting said stations, each set comprising a plurality of laterally spaced co-planar strands, a plurality of roller units including one or more rollers mounted upon shafts and adapted to carry said sets of travelling strands, with one of said roller units located in a receiving station and having certain of its rollers mounted eccentrically upon its shaft to alter periodically the planar spacing of certain of said strands whereby articles from a plurality of receiving stations may be concurrently transmitted to said terminal station.

3. In combination, a conveyer system having a terminal station and a main and an auxiliary receiving station, sets of laterally spaced co-planar strands travelling between said stations, a plurality of roller units including one or more rollers mounted upon shafts and engaged to carry said sets of travelling strands, with one of said roller units located in the auxiliary receiving station and having certain of its rollers mounted eccentrically upon its shaft to alter periodically the planar spacing of certain of said strands whereby articles from the main receiving station and the auxiliary receiving station may be transmitted to said terminal station.

4. In combination with a V-type conveyer having a plurality of receiving stations and a terminal station, a plurality of sets of laterally spaced co-planar strands travelling between said stations and mounted upon roller units consisting of a plurality of rollers mounted upon shafts with one roller unit located in a receiving station having alternate rollers mounted eccentrically upon its shaft to alter periodically the planar spacing of certain of said strands whereby articles from a plurality of receiving stations may be concurrently transmitted to the terminal station.

5. In a conveyer system, the combination of two independently operable conveyer sections, an intermediate conveyer section, an article supply source associated with said intermediate conveyer section, and means for rendering said intermediate conveyer section operable to receive articles from one of said former conveyer sections and from said supply source and to deliver said received articles to the other of said former sections, said intermediate conveyer section comprising an endless belt extending from the receiving end to the delivery end of the section, a second endless belt extending from the receiving end to the point of association of said supply source and having a face contiguous to and arranged to travel in the same direction as a face of the first belt, a third endless belt extending from said supply source association point to said delivery end and having a face contiguous to and arranged to travel in the same direction as said face of the first belt, said second and third endless belts also having contiguous faces arranged to travel in the same direction so as to convey articles received from said supply source and deliver them into said intermediate conveyer section.

6. A sheet-conveying system, for conveying sheets from a plurality of points to a common delivery point, comprising two endless traveling belts, means extending along and in contact with one face of one belt for a portion of the path of travel of said belt to hold sheets to said belt face for conveyance, and means extending along and in contact with one face of the second belt for a portion of the path of travel of said belt to hold sheets to said belt face for conveyance, said belts and said means contacting said faces of the belts being arranged to form two sheet-conveying lines joined at a point intermediate the ends of one of said lines to convey sheets from a plurality of points simultaneously to a common delivery point.

7. A sheet-conveying system, for conveying sheets from a plurality of points to a common delivery point, comprising two endless traveling belts, means extending along and in contact with one face of one belt for a portion of the path of travel of said belt to hold sheets to said belt for conveyance, and means extending along and in contact with one face of the second belt to hold sheets to said belt face for conveyance, said belts and said means contacting said faces of the belts being arranged to form two sheet-conveying lines joined at a point intermediate the ends of one of said lines to convey sheets from a plurality of points to a common delivery point, the belt face contacting means of the line which extends to the common delivery point providing a gap for admission of sheets into said line from the other line, and a portion of the belt and belt-face-contacting means of the other line nearest said gap forming a delivery end portion of that line which extends obliquely toward the gap in the general direction of travel of the other belt across said gap.

FERDINAND G. HENRY.